US009831918B2

United States Patent
Berkema et al.

(10) Patent No.: US 9,831,918 B2
(45) Date of Patent: Nov. 28, 2017

(54) SECURE WIRELESS PEER-PEER CONNECTION USING NEAR-FIELD COMMUNICATION

(75) Inventors: Alan C. Berkema, Granite Bay, CA (US); David O. Hamilton, Ramona, CA (US); Phillip A. Mccoog, Portland, OR (US); Randy Ingram, Battle Ground, WA (US); Xuesong Du, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/398,281

(22) PCT Filed: Jun. 8, 2012

(86) PCT No.: PCT/US2012/041577
§ 371 (c)(1),
(2), (4) Date: Oct. 31, 2014

(87) PCT Pub. No.: WO2013/184128
PCT Pub. Date: Dec. 12, 2013

(65) Prior Publication Data
US 2015/0111493 A1    Apr. 23, 2015

(51) Int. Cl.
*H04B 5/00* (2006.01)
*H04W 76/02* (2009.01)
(Continued)

(52) U.S. Cl.
CPC .......... *H04B 5/0031* (2013.01); *H04W 8/005* (2013.01); *H04W 12/08* (2013.01);
(Continued)

(58) Field of Classification Search
CPC . H04B 5/0031; H04B 17/382; H04W 76/023; H04W 8/005; H04W 4/008; H04M 1/7253
See application file for complete search history.

(56) References Cited

U.S. PATENT DOCUMENTS 8,175,643 B1    5/2012  Hawkins
2005/0223228 A1*  10/2005  Ogawa ................. H04L 63/061
                                    713/168
(Continued)

FOREIGN PATENT DOCUMENTS

CN    101843124    9/2010

OTHER PUBLICATIONS

Nokia Developer, "File sharing over Bluetooth initiated by NFC," created Dec. 27, 2011, edited Jun. 13, 2012, <http://web.archive.org/web/20120929025809/http://www.developer.nokia.com/Community/Wiki/File_sharing_over_Bluetooth_initiated_by_NFC>.

(Continued)

*Primary Examiner* — Andrew Wendell
(74) *Attorney, Agent, or Firm* — HP Inc. Patent Department

(57) ABSTRACT

A system (100) for establishing a secure wireless peer-to-peer (P2P) connection using near-field communication (NFC) comprising a first device (105), the first device (105) comprising near-field communication hardware (115) to communicate with a second device (110) and obtain a handover select record, in which the handover select record comprises data to establish a secure wireless peer-to-peer (P2P) connection with the second device (110), and in which a context of the first device (105) and second device (110) defines an action to be initiated on the second device (110).

12 Claims, 5 Drawing Sheets

(51) Int. Cl.
*H04W 8/00* (2009.01)
*H04W 12/08* (2009.01)
*H04W 84/18* (2009.01)
*H04W 92/18* (2009.01)
*H04M 1/725* (2006.01)

(52) U.S. Cl.
CPC ........ *H04W 76/023* (2013.01); *H04M 1/7253* (2013.01); *H04M 2250/04* (2013.01); *H04W 84/18* (2013.01); *H04W 92/18* (2013.01)

(56) References Cited

U.S. PATENT DOCUMENTS

| | | | |
|---|---|---|---|
| 2009/0111378 | A1 | 4/2009 | Sheynman et al. |
| 2011/0070825 | A1 | 3/2011 | Griffin et al. |
| 2011/0106954 | A1 | 5/2011 | Chatterjee et al. |
| 2011/0275316 | A1 | 11/2011 | Suumäki |
| 2012/0022948 | A1 | 1/2012 | Jones |
| 2012/0069771 | A1 | 3/2012 | Tandon et al. |
| 2012/0069772 | A1 | 3/2012 | Byrne et al. |
| 2012/0099566 | A1* | 4/2012 | Laine .................. H04M 1/7253 370/338 |
| 2012/0100803 | A1 | 4/2012 | Suumaki et al. |
| 2012/0238205 | A1* | 9/2012 | Reunamaki ............ H04B 5/02 455/41.1 |
| 2013/0141755 | A1* | 6/2013 | Miller ................ G06F 3/1204 358/1.15 |
| 2013/0309971 | A1* | 11/2013 | Kiukkonen ........... H04L 63/107 455/41.2 |
| 2014/0148098 | A1* | 5/2014 | Song .................. H04W 76/023 455/41.1 |
| 2015/0205550 | A1* | 7/2015 | Lee ...................... G06F 3/1204 358/1.15 |

OTHER PUBLICATIONS

Nokia Developer, "NFC Handover working principle," Dec. 29, 2011, <http://web.archive.org/web/20121018234621/http://www.developer.nokia.com/Community/Wiki/NFC_Handover_working_principle>.

Wikipedia, "Android Beam," Jul. 9, 2013, <http://web.archive.org/web/20130709022803/http://en.wikipedia.org/wiki/Android_Beam>.

International Preliminary' Report on Patentability received in PCT/US2012/041577, dated Dec. 18. 2014, 6 pages.

Chandler, N., "What is Android Beam?" HowStuffWorks, May 14, 2012, 2 pages, available at: http://electronics.howstuffworks.com/android-beam1.htm/printable.

Contactless Intelligence "Tap n' Print with NFC," (Web Page), Mar. 22, 2012, 5 pages.

International Search Report & Written Opinion received in PCT Application No. PCT/US2012/041577, Dec. 26, 2012, 9 pages.

Liu, R., "Android Beam lets you tap-to-share with NFC on Galaxy Nexus," SlashGear, Oct. 18, 2011, 9 pages, available at: http://www.slashgear.com/android-beam-lets-you-tap-to-share-with-nfc-on-galaxy-nexus-18189112/.

NFC Forum, "Connection Handover," Technical Specification, (Research Paper), Nov. 6, 2008, 43 pages.

Connection Handover Technical Specification; NFC Forum; Jul. 7, 2010; XP 55118241A.

European Patent Office. Extended European Search Report, dated Dec. 9, 2015. Application No. 12878327.1.

* cited by examiner

SECURE WIRELESS PEER-PEER CONNECTION USING NEAR-FIELD COMMUNICATION

BACKGROUND

A wireless peer-to-peer (P2P) network allows a user of the network to communicate with other users on the network securely and at high speeds. However, with wireless peer-to-peer (P2P), in order to connect to the network a user interacts, first, with the device in order to configure the connection. Once connected, the user initiates certain commands to direct certain devices connected to the network to do what he or she is seeking to accomplish over the network such as printing a document. These two processes may confuse some users and deter them from establishing a wireless connection with the network. Additionally, these processes may take additional time to complete further deterring a user who may be too busy otherwise.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
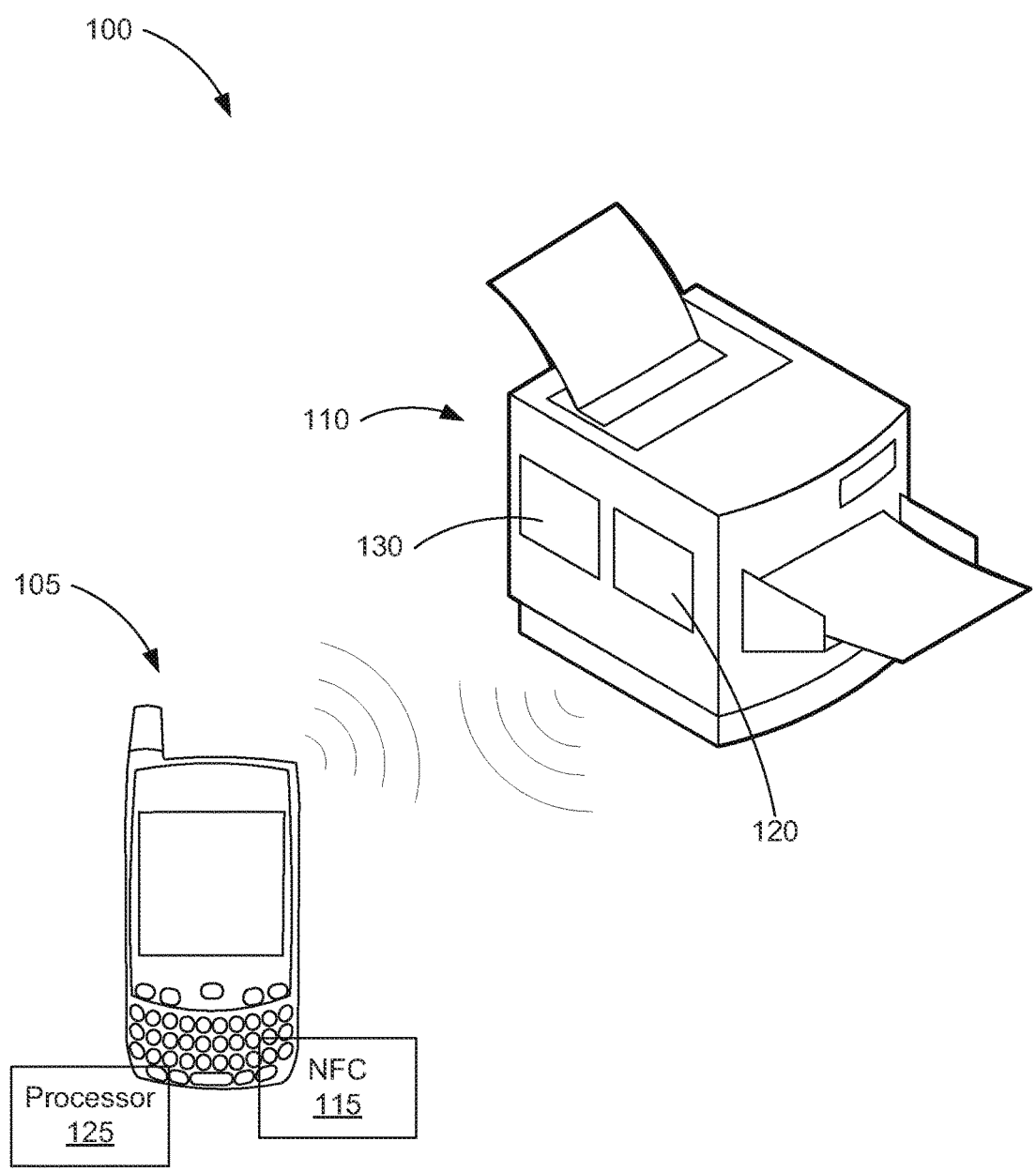
FIG. 1 is a block diagram showing a system for using a peer-to-peer (P2P) Near Field Communication (NFC) connection handover to establish a secure Wi-Fi Direct™ connection according to one example of principles described herein.

Gaining access to a network may consist of wirelessly connecting to a network via a wireless access point. A device connecting to a wireless network would then look for such an access point usually set apart within the network as a central hub to which a number of Wi-Fi devices may connect. In this situation, the devices connected to the central hub communicate to each other through the hub and not directly to each other.

Wi-Fi Direct™ (a product developed and administered by the Wi-Fi Alliance) has allowed a user of a Wi-Fi™ (a product developed and administered by the Wi-Fi Alliance) capable device to connect and communicate directly to another Wi-Fi device without a wireless access point. The Wi-Fi Direct™ specification describes a device discovery protocol which includes entering a listen state, a scan phase, and find phase to establish a common channel between two devices. It also defines a group formation protocol which can negotiate which device is to become the group owner and what provisioning methods may be used to exchange security credentials. However, these processes can be time consuming and difficult or complex for the typical user to understand. Indeed, when a user enters an area in which other Wi-Fi™ capable devices are located, the user will first make sure that his or her device's Wi-Fi Direct™ capabilities are turned on. Once this is completed, the user is notified of the available devices via a list presented to the user on a graphical user interface. Any device not having Wi-Fi Direct™ capabilities or which does not have the Wi-Fi Direct™ settings enabled will not appear in the list. The user then selects the device he or she wants to form a connection with and the device begins to establish the connection. The communication between the devices begins and may take some time to complete. After communication has been established, activities in which the user wishes to engage in may take additional time to complete.

Connection to a wireless local area network (WLAN) using Wi-Fi Protected Setup (WPS) may also have some disadvantages. The Wi-Fi protected setup (WPS) protocol is a standard to establish Wi-Fi connections and defines a data format to communicate security credentials needed to make a connection. However, WPS does not provide an explanation of how to establish a Wi-Fi Direct™ connection or how to format a connection as a Near-Field Connection (NFC) handover.

Additionally, with the Push Button Configuration (PBC) method in WPS it becomes difficult to design a universal user interface that will instruct the user how to push the button on the device it is connecting to. The button can be physical or virtual button on the device. Typically on a Wi-Fi™ access point such as a router, the physical button that must be pushed may be located on the top, bottom or on the back of the device. Additionally, the button is not always clearly identified and if identified at all may not be marked in a way the user is accustomed to. Still further, the button on a printer, for example, could be a virtual button represented on the user interface of the printer. Here the user must navigate through any menu options to select that button. Writing generic instructions that direct where to find and how to actuate the button has proven difficult especially with the various types and models of devices available.

It should also be noted that access to the button on a device may be restricted. Indeed, when a user has entered a location in which he or she has no right to gain access to the physical devices such as the routers, the user may not be allowed to even see the device, let alone establish a connection using the push button configuration method. Consequently, in this way implementation of the push button configuration method limits the number of devices a user can connect to.

Using the Personal Identification Number (PIN) method over a Wi-Fi Protected Setup (WPS) may also have some disadvantages. With devices that use such a method, a PIN is usually written on a sticker (label) or provided via a display. The user interface of the user's device may then instruct the user to enter in this PIN. Especially if the device is small like a smart phone, mistakes may be made in transcribing the number to the user interface. Additionally, users may be deterred from completing this task in light of the level of interaction needed to establish a connection with the device.

Near Field Communication (NFC) is a technology developed to establish radio communication between devices in close proximity. During a tap procedure where one NFC-enabled device is brought into close proximity to another NFC-enabled device, the second device may provide to the first device information about the infrastructure of the network such as the network passphrase and SSID. With this information, the first device may be allowed to connect to the network.

NFC, however, provides a slow communication between devices. Additionally, NFC may not be a secure connection. Although an "eavesdropper" may have to be just a few meters away from the communicating devices, it is still possible to pick up the communications between the devices using an antenna.

NFC, however, provides a "NFC handover" standard for "handing over" from an NFC communication mode to a higher speed connection mode. NFC handover, however, does not provide an explanation of how to use it to perform a job such as send pictures or print to a device. All of these methods of establishing communication between two devices over a wireless network do not allow the user to connect and, immediately after connection, complete an action on the second device such as sending an email, sharing a photo, uploading a data file, downloading a data file, displaying a video, displaying a picture, or printing a document. Indeed, in order for a user to complete an action using the above methods, the user must first establish the connection and then complete an additional process, such as a print command, via a program on the first device.

The present specification therefore describes a peer to peer (P2P) Near Field Communication (NFC) connection handover which will establish a secure Wi-Fi Direct™ connection between a first device and a second device. The NFC may be used to read information needed to establish the P2P connection and the NFC handover standard may be used as the data framework for the information read over the NFC communication. Once the connection is established an action may be completed automatically based on the context the first device was in. For example, if the first device was a smartphone and the user was viewing a photo from his or her photo album, a tap to a printer will automatically establish a connection and print the photo based on the state that the smartphone was in.

Specifically, the present specification a system for establishing a secure wireless peer-to-peer (P2P) connection using near-field communication (NFC) comprising a first device, the first device comprising near-field communication hardware to communicate with a second device and obtain a handover select record, in which the handover select record comprises data to establish a secure wireless peer-to-peer (P2P) connection with the second device. Additionally, a context of the first device and second device may define an action to be initiated on the second device. The specification further describes a method of establishing a secure wireless peer-to-peer (P2P) connection using near-field communication (NFC), comprising establishing a near-field communication between a first and a second device, obtaining a near-field communication handover select record from the second device, establishing a secure wireless peer-to-peer (P2P) connection between the first and second devices using information provided in the handover select record, and performing an action on the second device based on the context of the first device.

Throughout the specification and drawings, the term Wi-Fi™ may be used to describe a technology that allows an electronic device to exchange data and communicate with other devices wirelessly over a computer network. Wi-Fi™ is a trademarked technology developed by the Wi-Fi Alliance. Therefore, in the present specification and in the appended claims the term "wireless local area network (WLAN)" is meant to be understood broadly as any technology that forms a network wirelessly including those developed by the Wi-Fi Alliance and specifically Wi-Fi™ technology.

Additionally, in the present specification and in the appended claims the term "network" is meant to be understood broadly as any resource, such as an appliance, computer, or storage device that is connected virtually or physically. In one example a network may be created when one device establishes any communicative connection with any other device.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Turning now to FIG. 1, a system (100) for using a peer to peer (P2P) Near Field Communication (NFC) connection handover to establish a secure Wi-Fi Direct™ connection according to one example of principles described herein is shown. The system (100) may comprise a first device (105) and a second device (110). The devices (105, 110) depicted in FIG. 1 show a smart phone and printer respectively. However, the devices shown in FIG. 1 are merely examples and the present specification describes situations where the first (105) and second (110) devices could be any type of device. These devices (105, 110) may include, for example, a smart phone, a tablet device, a scanner, a printer, a desktop computer, a laptop computer, a personal digital assistant (PDA), a fax machine, a router, a server, or any device capable of establishing a wireless connection with other devices on a network. The present specification, however, will be described in terms of the first device (105) being a smartphone and the second device (110) being a printer.

The first device (105) comprises near-field communication hardware (115) that, using a processor (125), reads an NFC tag (120) on a second device (110) such as the printer depicted in FIG. 1. As will be explained in more detail below, the first device (105) and second device (110), with a corresponding processor (130), may engage in either a negotiated handover process or an informed static handover process. In either case, the first device (105) receiving a handover select record from the tag (120) on the second device (110) by actively generating a radio frequency signal field that can power the tag (120). Additionally, in either case, the term "informed" in "informed static handover process" is meant to be understood broadly as receiving additional information from the second device such that the second device is read one time and consequently provides the first device with the information to be able to choose the connection based on connection capabilities. The additional information may also inform the first device as to whether a current connection could be used instead of creating a new connection.

The handover select record may comprise specifications for the NFC handover. Additionally the handover select record comprises a Wi-Fi peer-to-peer configuration record that details the information used to establish a Wi-Fi connection with the second device (110). Because this additional information is provided to the first device (105) over NFC, the information may be received relatively quicker than had the first (105) and second (110) devices attempted to establish a Wi-Fi connection without a NFC handover.

With the information provided in the handover select record, the first device (105) may begin to establish a secure peer-to-peer connection with the second device (110). The process may consist of the first device (105) sending an IEEE 802.11 authentication request over the air to the second device (110). The second device then sends back to the first device (105) an authenticate response. The first device (105) then sends an association request and the second device (110) responds to it by sending an association response.

The first (105) and second devices (110) may then run a robust security network (RSN) standard 4-way handshake protocol using the credentials exchanged in the NFC WSC handover record. Once a Wi-Fi Direct™ group is established, the first (105) and second (110) devices are connected and the user is able to complete a number of actions. In one example, tapping the first device (105) to the second device (110) completes the connection process above, and depending on what the user was doing on the first device (105) a prompt may appear on the first device (105) notifying the user that an action may be completed. For example, when a user has started listening to a music track provided by the first device (105), if the user were to approach an audio device that is Wi-Fi Direct™ capable, the first device will notify the user that there is a Wi-Fi Direct™ capable device that has established a connection and which is capable of playing that track. The user may then interact with the device appropriately to allow that music to be played on the audio device.

In another example such as the example shown in FIG. 1, a user may be allowed to simply tap the first device (105) to the second device (110) and have an action completed without interfacing with the first device (105). In the example shown in FIG. 1, the first device (105) is a smart phone (105) on which the user may be viewing a photo. The second device (110) is a printer (110) that is Wi-Fi Direct™ enabled. Tapping the smart phone to the printer causes the NFC handover request record to be exchanged as described above and the Wi-Fi Direct™ connection established. However, the devices (105, 110) note that the first device is currently displaying a photo. Because the second device (110) is a printer, the devices (105, 110) conclude that, based on the context or state of the first device, the photo being viewed is to be printed. The devices (105, 110) then cause the printing to begin. In this example, the user sees that a photo being viewed on the first device (105), after tapping the first device (105) to the printer, is printed. Indeed, the user is unaware of the handover or connection processes and sees that what he or she intended to do is being done by the printer in a relatively easy and quick manner.

Figure 2:
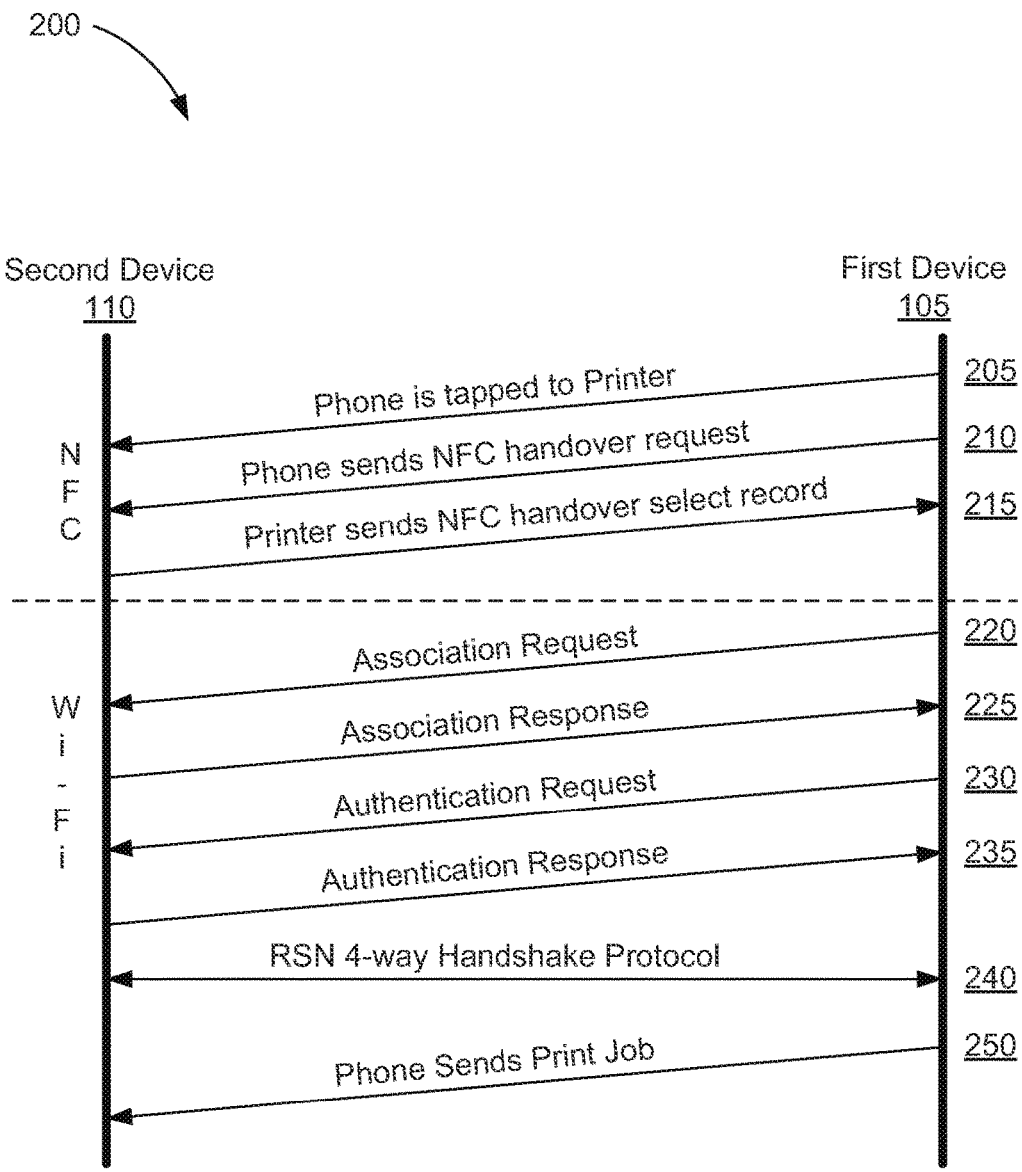
FIG. 2 is a sequence chart showing a method of exchanging configuration information security credentials to establish a secure wireless P2P connection using near-field communication (NFC) according to one example of the principles described herein.
Figure 3:
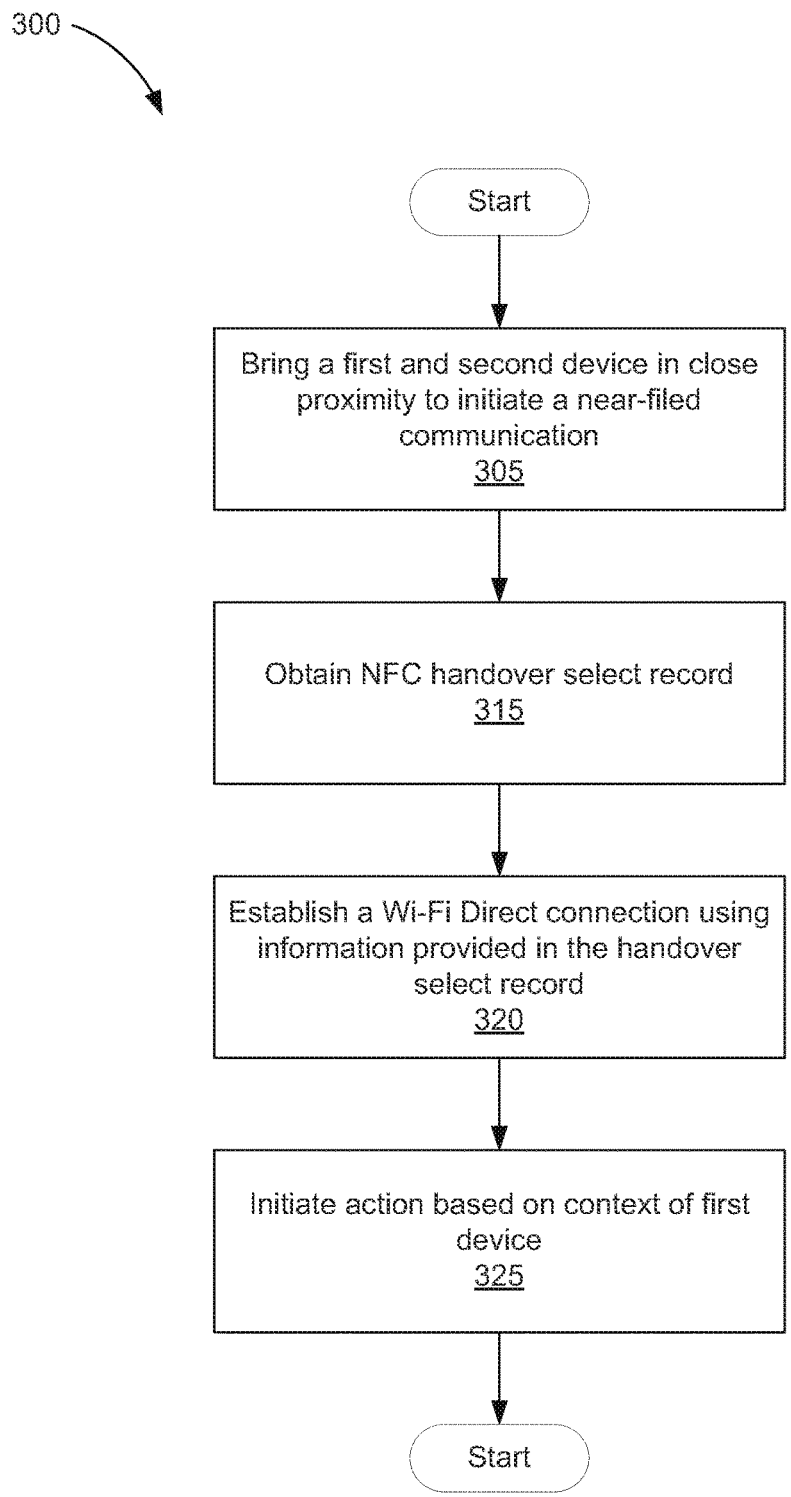
FIG. 3 is a flowchart showing the method shown in FIG. 2 according to one example of the principles described herein.

FIG. 2 is a sequence chart (200) showing a method of exchanging configuration information security credentials to establish a secure wireless P2P connection using near-field communication (NFC) according to one example of the principles described herein. FIG. 3 is a flowchart showing the method shown in FIG. 2 according to one example of the principles described herein. As briefly described above, the Wi-Fi Direct™ enabled first (105) and second devices (110) may be brought into close proximity. The method may begin with a near-field communication being initiated by bringing (305) a first (105) and second (110) device in close proximity. When the first device (105), in this case a phone, is tapped (205) to a second device, in this case a printer, the phone obtains (310) a NFC handover select record. This may be accomplished in two different ways depending on if the printer is capable of engaging in a negotiated handover process or is comprised of hardware that limits the exchange of the handover select record statically. Where the printer comprises sufficient hardware to engage in a negotiated handover process, the process may proceed as depicted in FIG. 2. Specifically, the phone (105) may send (210) a NFC handover request to the printer in the form of a NFC data exchange format (NDEF) message. The printer (110) may then, in response to the request (210), send (215) the handover select record.

Where the printer (110) does not constitute an NFC forum device but has, instead, a NFC forum tag attached, the tag may be read by the phone (105) and the handover select record may be obtained (310). The NFC forum tags on the printer may provide storage space sufficient to store the information included in the above mentioned handover select record. Because it is not possible for an NFC forum tag to receive and interpret a handover request message and to dynamically construct a corresponding handover select message, the phone (105), through the use of a radio frequency (RF) signal, obtains (315) that information.

With the information provided in the handover select record, a Wi-Fi Direct™ connection may be established (320). Specifically, the phone (105) may send (220) an association request to the printer (110). The association request (220) may establish the identity of the phone (105) with the printer (110) either through an open system or shared key authentication. Either way, the printer (110) may reply to the phone (105) with an association response.

Once the association request has been sent (220) and responded to (225) an authentication request may be sent (230) by the phone. An authentication response may then be sent to the phone (105) from the printer (110) in response. A robust security network (RSN) 4-way handshake protocol may then be engaged (240) using the additional information included in the NFC handover select record by the printer (110) earlier. An action may then be initiated (325) based on the context of the first device. Specifically, because the first (105) and second devices (110) in the example of FIG. 2 are a phone and printer respectively, the phone (105) has received enough information within the handover select record to understand that the second device (110) is a printer and will send (250) a print job to the printer (110) based on the fact that the user was currently viewing a photo and has tapped the phone (105) to the printer (110).

Figure 4:
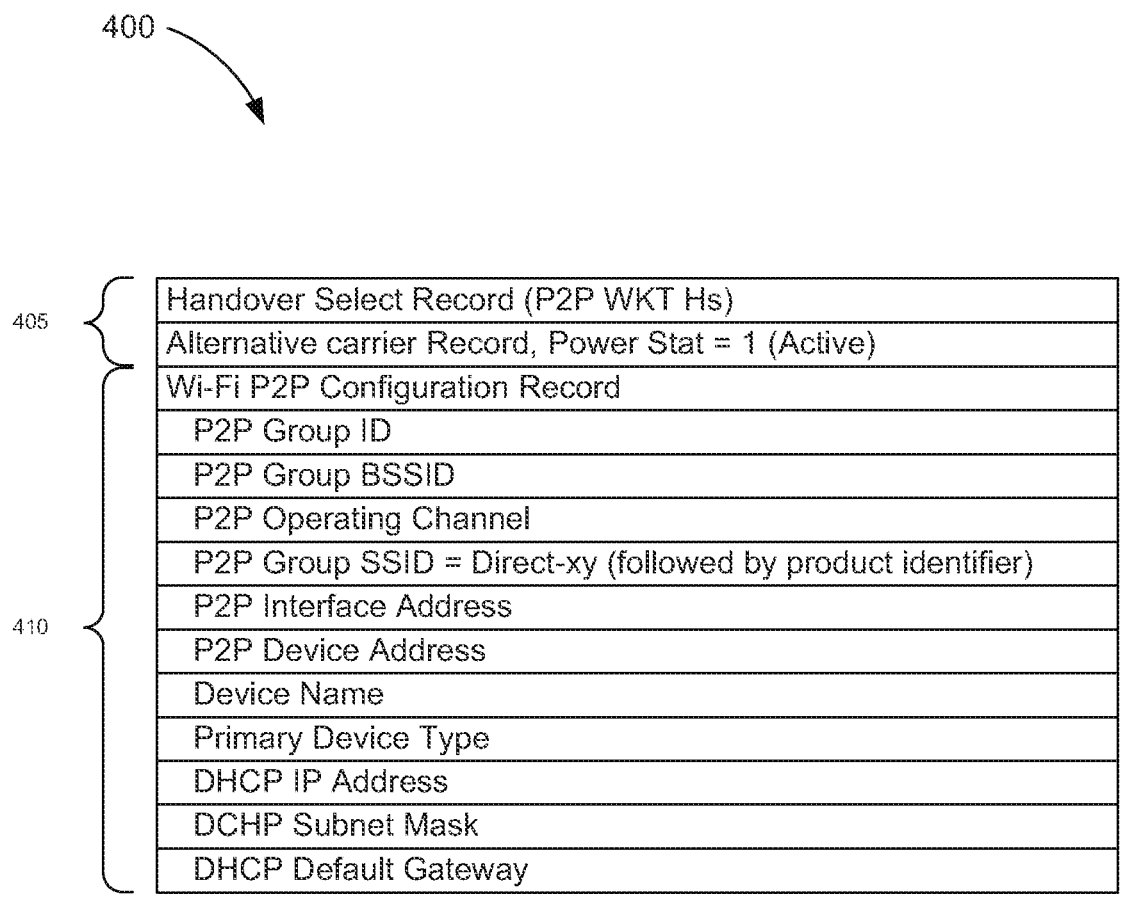
FIG. 4 is a block diagram showing a handover select record according to one example of the principles described herein.

FIG. 4 is a block diagram showing a handover select record (400) according to one example of the principles described herein. Part of the handover select record (400) may be defined by the NFC handover specifications (405) and another part provides information (410) sufficient to establish a Wi-Fi Direct™ connection without having to first proceed through the relatively lengthy peer-to-peer discovery protocol. Therefore, all of this information is received over the NFC connection. The information (410) sufficient to establish a Wi-Fi Direct™ connection may include a peer-to-peer group identifier (ID), a peer-to-peer group basic service set identification (BSSID), a peer-to-peer operating channel, a peer-to-peer group service set identification (SSID), a peer-to-peer interface address, a peer-to-peer device address, the name of the device, the primary device type, a dynamic host configuration protocol (DHCP) internet protocol (IP) address, a DHCP subnet mask, and a DHCP default gateway.

Additional information may be included in the handover select record (400) beyond what is described in FIG. 4. One example may include any specific capabilities of the second device (110). For example, if the second device (110) were a printer, the additional information may include whether the printer can print on both sides of a sheet of paper, whether the printer can print photos on photo paper, whether it can collate, whether it can staple and other information describing the features of the printer.

The peer-to-peer handover select record therefore provides enough information to quickly establish a secure wireless P2P connection. Once connected the first device (105) can learn more about the specific capabilities of the network by looking at the information included in the information elements (IEs) the printer transmits in its IEEE 802.11 beacons.

Figure 5:
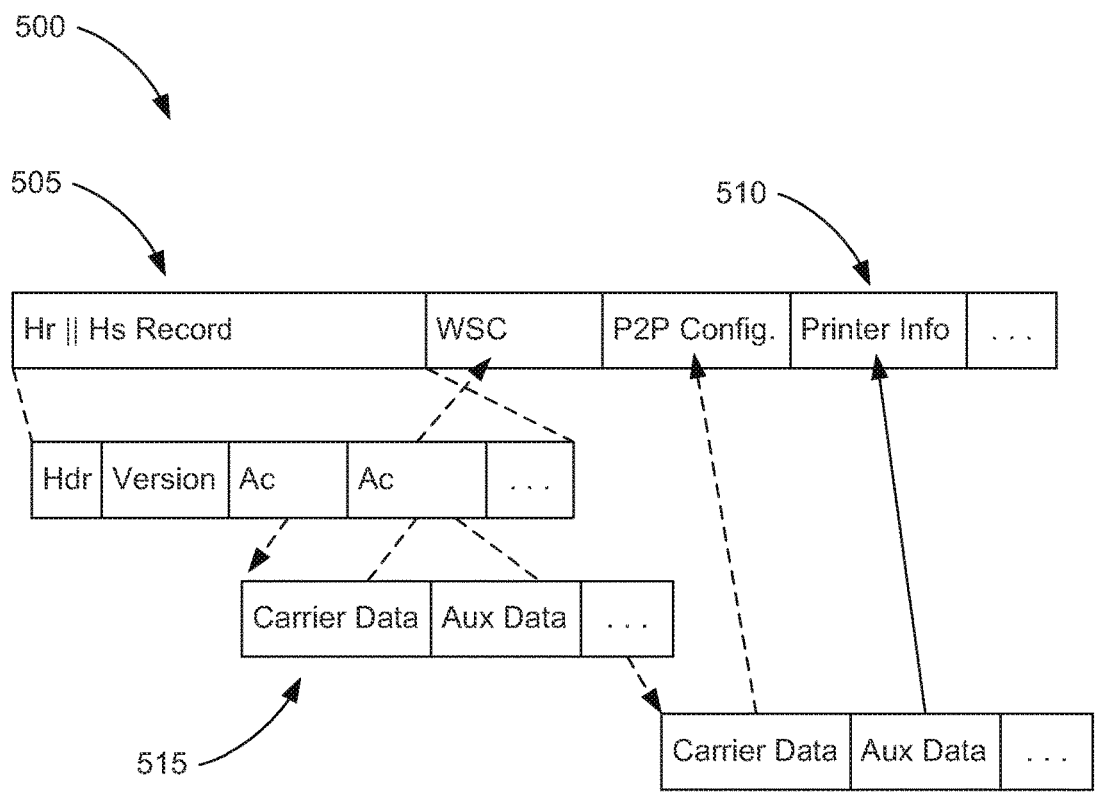
FIG. 5 is a block diagram showing an example NFC handover message structure according to one example of the principles described herein.

Turning now to FIG. 5, a block diagram depicting an example NFC handover message structure (500) according to one example of the principles described herein is shown. The message structure comprises a number of fields (505) into which the information in FIG. 4, may be entered. In this case, additional information may be included in the message sufficient to establish a Wi-Fi Direct™ connection. Additionally, printer information (510) may be provided to the first device (105) informing the first device that the second device (110) is indeed a printer and that it is capable of completing certain tasks based on the features of that printer (110). Further, the message structure may comprise fields (515) descriptive of alliterative carriers (ac).

In one example, the NFC handover message (500) may include a number of viable connections a user can choose to connect to as well as what can be accomplished over that connection. Multiple carrier records (FIG. 4, 400) comprising a description of, for example, a Wi-Fi Direct™ connection as well as other networks available to the first device (105). For example, the second device (110) may provide the information sufficient to establish a Wi-Fi Direct™ connection with the printer. Included along with this information, the printer (110) or handover tag on the printer (110) may provide information regarding which network the printer is located on. If the first device (105) sees that it is already connected to the second device (110) via the network, it will forgo establishing a new connection with the second device (110) and send a print command, for example, to the second device (110) when the handover record is received via the NFC communication. In this example, the first device (105) may not have to constantly switch from one network connection to another every time it is to interface between specific devices. Instead, the first device (105) may establish an NFC connection, receive the above information, and decide which way is the best way to complete the task the user wants completed.

Although the above figures and description describe a scenario of conducting a peer-to-peer (P2P) Near Field Communication (NFC) connection handover in order to establish a secure Wi-Fi Direct™ connection using a phone (105) and a printer (110) as examples, it should be noted that these are merely examples. Other examples include a number of other types of devices (105, 110) that can establish such a communication and complete a task based on the context of the first device.

The principles described above may also be accomplished through the use of a computer program product. The computer program product for exchanging configuration information security credentials to establish a secure wireless P2P connection using near-field communication (NFC). The computer program product may comprise a computer readable storage medium having computer usable program code embodied therewith. The computer readable storage medium may comprise computer usable program code to, when executed by a processor, initiate a near-field communication between a first (105) and a second device (110) that has been brought in close proximity to each other. The computer readable storage medium may further comprise computer usable program code to, when executed by a processor, obtain NFC handover select records from the second device (110). The computer readable storage medium may also comprise computer usable program code to, when executed by a processor, establish a Wi-Fi Direct™ connection using information provided in the handover select record. Still further, the computer readable storage medium may comprise computer usable program code to, when executed by a processor, initiate an action based on context of first device (105) on the second device (110).

The specification and figures describe a system for establishing a secure wireless peer-to-peer (P2P) connection using near-field communication (NFC). The system includes a first and a second device; the first device using a near-field connection to access a handover select record on the second device. The handover select record includes information that allows the first device to establish a Wi-Fi connection with the second device in a relatively quicker way. The user may then have an action executed on the second device based upon the context in which the connection was made. This system for establishing a secure wireless peer-to-peer (P2P) connection using near-field communication (NFC) may have a number of advantages. One advantage is that a high speed Wi-Fi connection may be established with the second device without having to wait an extended period of time or manually entering information about the second device into the first device. Additionally, a user of the system may simply tap the second device with the first and, without knowing the processes involved, establish an immediate connection with the second device and have the action executed on the second device without any further interaction with the first or second device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A first device for establishing a secure wireless peer-to-peer (P2P) connection with a second device using near-field communication (NFC), the first device comprising:
    a processor; and
    near-field communication (NFC) hardware operated by the processor to communicate with the second device and obtain a NFC handover select record from the second device, wherein the NFC handover select record comprises security credential data to establish a secure wireless peer-to-peer (P2P) connection with the second device,
    wherein the processor is to run a robust security network (RSN) handshake protocol with the second device using the security credential data in the NFC handover select record to establish the secure wireless P2P connection with the second device, and
    wherein, after establishment of the secure wireless P2P connection with the second device, the first device is to create a print job of an image displayed on the first device and automatically cause the print job to be printed on the second device.

2. The first device of claim 1, wherein the NFC hardware of the first device comprises hardware to initiate one of a negotiated handover process and an informed static handover process.

3. The first device of claim 1, wherein the NFC handover select record contains information that identifies the second device as a printer.

4. The first device of claim 1, wherein the NFC handover select record comprises a number of alternate network connections to which the first device is able to establish a connection with the second device,
the first device determines if it is currently connected to one of the number of alternate network connections, and
if the first device determines it is currently connected to one of the number of alternate network connections, the first device forgoes establishing a new connection with the second device.

5. The first device of claim 1, wherein the NFC handover select record comprises a number of alternate network connections to which the first device is able to establish a connection with the second device,
the first device determines if it is currently connected to one of the number of network connections, and
if the first device determines it is not currently connected to one of the number of network connections, the first device establishes a new connection with the second device.

6. The first device of claim 1, wherein a context of the first device defines an action to be initiated on the second device,
wherein the context comprises a determination of a state of the first device and capabilities of the second device, and
wherein information describing the capabilities of the second device is provided in the handover select record.

7. A printer comprising:
a near-field communication (NFC) tag that is to be read by NFC hardware on an external device;
a processor, wherein the processor is to:
receive an NFC handover request from the external device,
send an NFC handover select record to the external device in response to receipt of the NFC handover request, the NFC handover select record comprising security credential information pertaining to networks available to the external device on which the external device is able to connect to the printer and information identifying the printer as a printer,
receive the security credential information in the NFC handover select record back from the external device, and
run a robust security network (RSN) handshake protocol with the external device using the security credential information received from the external device to establish a secure wireless peer-to-peer (P2P) connection between the printer and the external device; and
a printing mechanism to print a print job received from the external device through the wireless peer-to-peer connection, wherein the external device is to create the print job, after establishment of the secure wireless peer-to-peer connection, based on a context or a state of the external device.

8. The printer of claim 7, wherein the processor is to send the NFC handover select record to the external device following one of a negotiated handover process with the external device and a static handover process.

9. The printer of claim 7, wherein the processor is to determine, based on the context or the state of the external device, that an image to be printed is being displayed on the external device and to cause the printing mechanism to print the image automatically in response to the determination that the image is being displayed on the external device.

10. The printer of claim 7, wherein the NFC handover select record contains information to enable the printer to be connected to the external device through the wireless P2P connection without requiring that the printer and the external device undergo a P2P discovery protocol.

11. The printer of claim 7, wherein the NFC handover select record contains information pertaining to printing capabilities of the printer.

12. A non-transitory computer readable storage medium comprising computer usable program code that when executed by a processor of a first device cause the processor to:
with near-field communication (NFC) hardware of the first device, communicate with a second device to obtain a NFC handover select record, wherein the NFC handover select record comprises security credential data and a number of alternate network connections to which the first device is able to establish a connection;
run a robust security network (RSN) handshake protocol with the second device using the security credential data in the NFC handover select record to establish a secure wireless peer-to-peer (P2P) connection with the second device;
determine, from the handover select record, that the second device is a printer;
based on the determination that the second device is a printer and the first device currently displaying an image, cause the printer to automatically print the image, based on a context of the first device that the image displayed on the first device is to be printed.

* * * * *